United States Patent [19]

Holley-Donawa

[11] 4,269,148
[45] May 26, 1981

[54] ANIMAL EXCREMENT AND URINE RECEPTACLE APPARATUS

[76] Inventor: Gloria Holley-Donawa, 284 Sunrise Ter., Springfield, Mass. 01119

[21] Appl. No.: 73,306

[22] Filed: Sep. 7, 1979

[51] Int. Cl.³ .............................................. A01K 23/00
[52] U.S. Cl. ...................................... 119/95; 128/283
[58] Field of Search ............................ 119/1, 95, 143; 128/283

[56] References Cited

U.S. PATENT DOCUMENTS

| | | | |
|---|---|---|---|
| 3,006,343 | 10/1961 | Baxter | 128/283 |
| 3,656,459 | 4/1972 | Missud | 119/95 |
| 3,786,787 | 1/1974 | Weinberger | 119/95 |
| 4,103,645 | 8/1978 | Tyler | 119/95 |
| 4,156,402 | 5/1979 | Naiztat | 119/95 |

Primary Examiner—Gene Mancene
Assistant Examiner—Robert P. Swiatek
Attorney, Agent, or Firm—Chapin, Neal & Dempsey

[57] ABSTRACT

Apparatus for collecting animal excrement for disposal thereof. The apparatus comprises a harness adapted to fit over the posterior of the animal and a disposable excrement receiving bag that is releasably attached to the harness. The harness is economically constructed from a planar arrangement of interconnected flexible straps. The bag is fixed to the harness such that the bag covers an adjacent portion of the harness to minimize the risk of the soiling thereof by the excrement. The bags themselves do not require and are thus not provided with any fasteners and, therefore, may be changed frequently without sacrificing economy.

8 Claims, 5 Drawing Figures

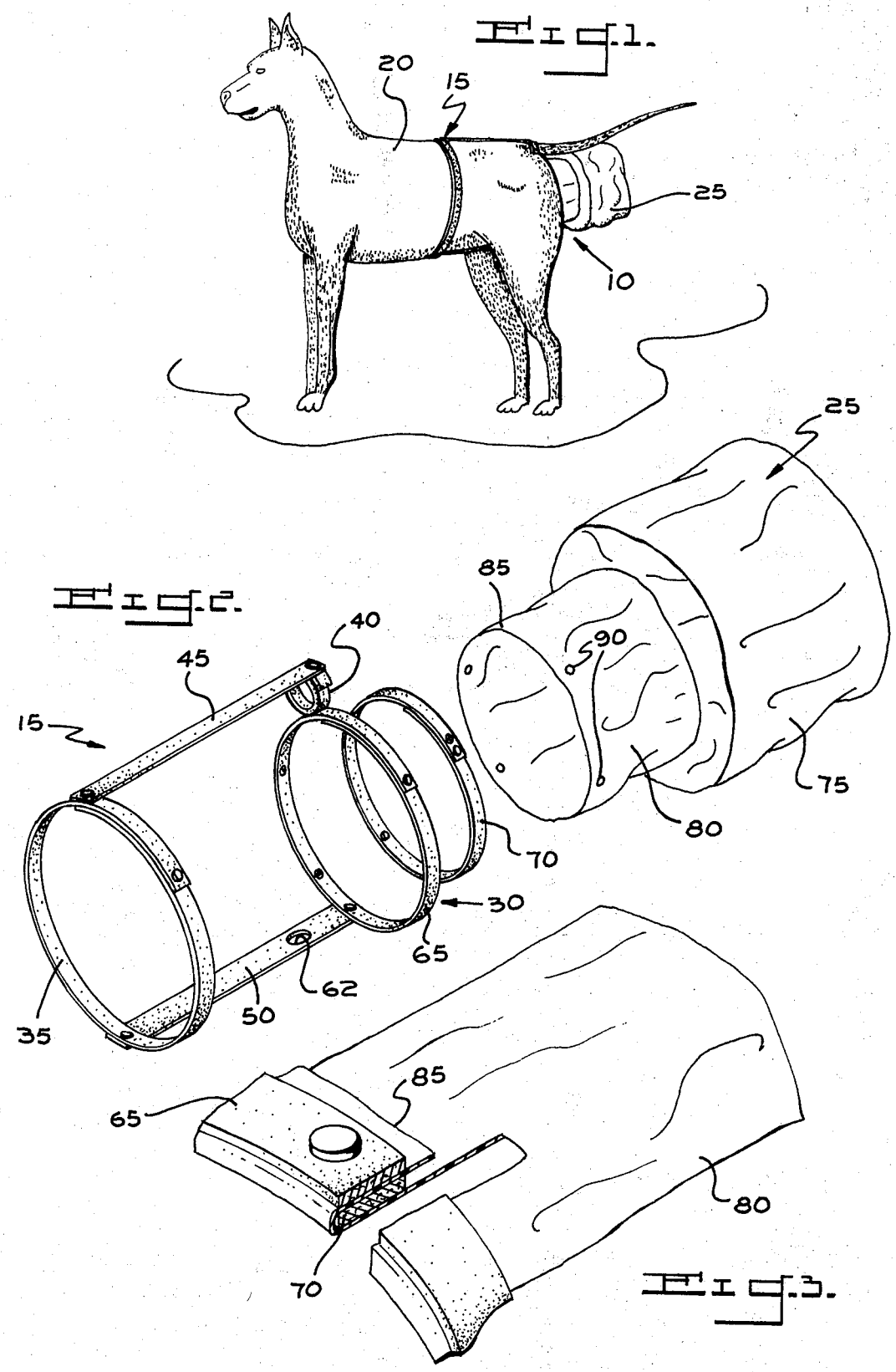

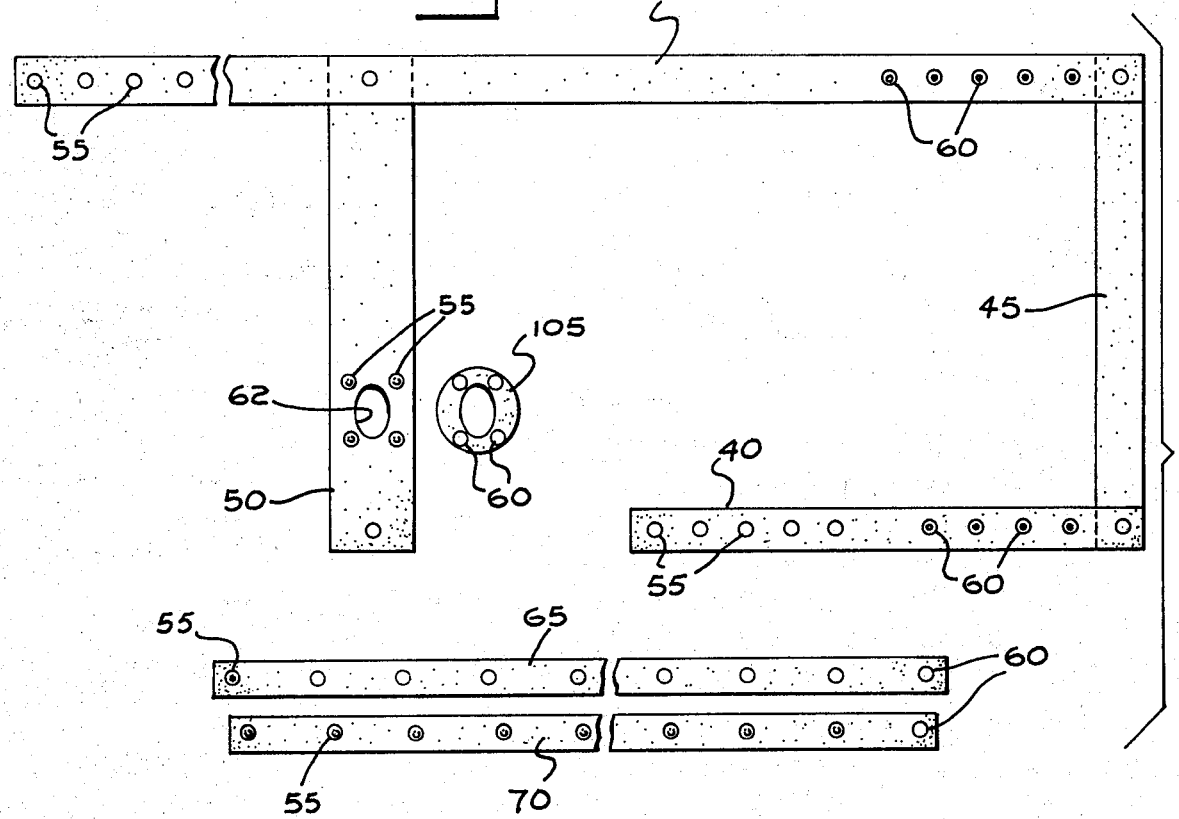
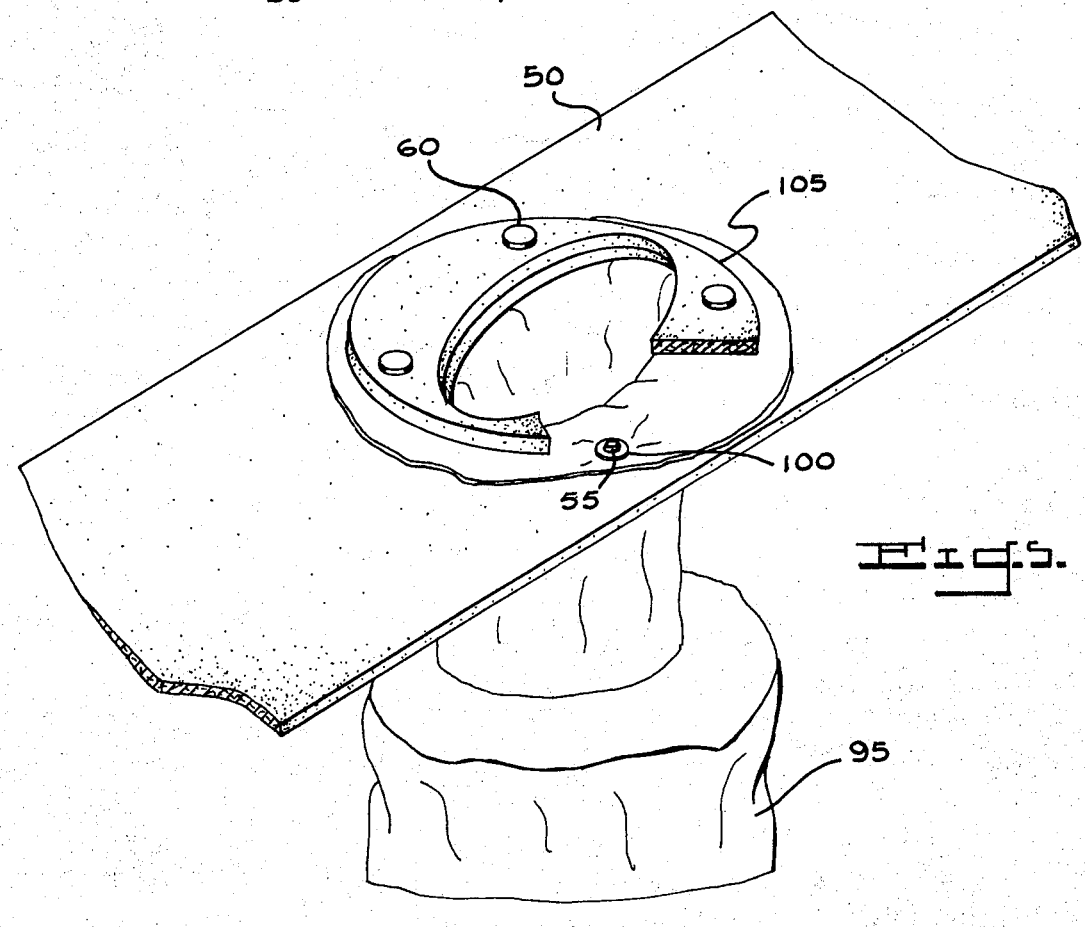

ANIMAL EXCREMENT AND URINE RECEPTACLE APPARATUS

BACKGROUND

Disposal of waste from animals such as house pets and the like is required in certain situations for purposes of aesthetics and sanitation. Recently, local ordinances enacted in certain metropolitan areas provide for the fine of a pet owner who fails to clean up waste deposited by his pet in public areas. As any pet owner knows, the removal of solid animal excrement from a surface on which it has fallen is an extremely unpleasant task. Therefore, there have been proposed apparatus employing an excrement receiving bag and a device for attaching the bag to an animal, wherein the excrement from the animal drops in the bag which may then be detached from the animal and thrown away. While such apparatus may cause the disposal of animal waste to be less objectionable, these apparatus often employ bag and attaching devices of complex construction which are costly to manufacture and, therefore, to purchase by the consumer. Moreover, such complex construction often renders the apparatus complicated in operation as in attaching to the animal, and cumbersome and, therefore, uncomfortable for the animal.

Accordingly, it is an object of the present invention to provide an excrement and urine receptacle apparatus for animals which apparatus overcomes the deficiencies of the prior art.

It is another object of the present invention to provide such apparatus which is economical to manufacture and purchase.

It is another object of the present invention to provide such apparatus which is uncomplicated in construction and convenient in operation.

It is yet another object of the present invention to provide such an apparatus which is lightweight and, therefore, worn by the animal in comfort.

SUMMARY OF THE INVENTION

These and other objects which appear more apparent from the following detailed description taken in connection with the appended claims and accompanying drawings are attained by the apparatus of the present invention which comprises a lightweight harness of generally planar configuration when in an unfolded condition, a disposable bag, and means for quickly and conveniently attaching the bag to, and releasing the bag from the harness. The harness and bag attaching means are economically constructed of straight, flexible straps or tapes fixed to one another as by stitching. Certain of the straps are attachable to one another by means of fasteners such as snaps for securing the harness to the animal. The straps may be of adjustable length as by forming from an elastic material. The disposable waste receiving bag is attached to the harness in such a manner that a portion of the bag, adjacent the mouth thereof covers the adjacent portion of the harness thereby minimizing the soiling of the harness by the waste products. The bag is of uncomplicated, economical design and is conveniently detached from the harness, disposed of and replaced by a clean bag.

DESCRIPTION OF THE DRAWINGS

FIG. 1 is a perspective view of the apparatus of the present invention in use on an animal;

FIG. 2 is an exploded perspective view of the apparatus of the present invention;

FIG. 3 is a fragmented, perspective view of the means by which the disposable bag mounts to the harness of the present invention;

FIG. 4 is a plan view of the harness in an unfolded, collapsed condition; and

FIG. 5 is a fragmented, perspective view of an alternate embodiment of a portion of the apparatus.

DESCRIPTION OF THE PREFERRED EMBODIMENT

Referring to the drawings, the animal excrement and urine receptacle apparatus of the present invention is shown at 10 and comprises a harness 15 which fits over the posterior of animal 20 such as a dog, cat, or other domestic animal, a disposable bag 25 which receives the animal excrement and means 30 for mounting the bag to the harness.

Referring to FIGS. 2 and 4, the harness comprises a plurality of straps or tapes connected in a generally open, planar configuration. The straps may be formed of any material of suitable flexibility and durability. In the preferred embodiment, to render the harness more readily adaptable to animals of varying size, the straps are formed of elastic tapes. For ease and economy of assembly, the harness comprises four straps 35, 40, 45, 50 sewn or similarly attached together in an open rectangular configuration. Straps 35 and 40 are generally parallel and girth the body and tail respectively of the animal. The ends of these straps attach to themselves as shown in FIG. 2 when the harness is mounted on the animal by means of pairs of mating fasteners 55 and 60, thereby maintaining the straps secured about the animal's body and tail (FIG. 4). In the preferred embodiment, these fasteners comprise pairs of mating snap fasteners although other equivalent fasteners such as those sold under the trademark VELCRO may be employed without departing from this invention.

Depending from straps 35 and 40 and attached therebetween as by sewing are longitudinal straps 45 and 50 which overlie the back and underlie the stomach of the animal. As illustrated in FIG. 2, stomach strap 50 is provided at a rear portion thereof with an aperture 62 through which the animal may urinate. As will be observed from FIG. 2, strap 45 aids in maintaining the alignment of the harness on the animal and strap 50 both maintains such alignment and provides a location for attachment of the disposable bag. It will be understood that for certain applications, back strap 45 may not be required. Thus, the tail girthing strap 40 may be formed separately from the remainder of the harness being secured thereto by the bag mounting means 30. Furthermore, rather than straps 45 and 50, the harness may be provided with straps which, when the harness is attached to the animal, overlie the sides of the animal and, as straps 45 and 50, provide with tail strap 40, points of connection for the bag mounting apparatus.

Means 30 for mounting the bag to the harness comprises a pair of concentric, preferably flexible frames or rings 65 and 70. As shown in FIGS. 2 and 4 each of the rings may be formed from a straight length of flexible strip material or tape such as that employed in the straps forming harness 15. Each of the rings is provided along portions of the length thereof with interfitting fasteners 55 and 60, such as the snap or VELCRO fasteners described hereinabove with respect to the harness. Of course, outer ring 65 comprises a longer strip than inner ring 70 so that when the ends of the outer ring strip are connected, the strip will form a ring of a dimension sufficient to accommodate the smaller ring therebetween. Bag mounting means 30 is attached to the harness by the interengagement of mating pairs of the aforementioned fasteners disposed on the outer ring 65, the tail girthing strap 40 and stomach strap 50.

Bag 25 is disposable, being formed from polyethylene or the like and includes a body portion 75 and a neck 80 of reduced diameter extending from the body portion. Reduced neck 80 aids in isolating excrement received in the bag from the animal's posterior and allows the bag, when removed from the apparatus to be conveniently sealed as by tying. Neck 80 defines at the free edge thereof a mouth 85 provided around the periphery thereof with a plurality of spaced apertures 90. As best illustrated in FIG. 3, the bag is attached to the apparatus of the present invention between rings 65 and 70, the mouth of the bag being received inwardly of inner ring 70, doubled over on itself enveloping the inner ring and thereby also being disposed between the inner and outer rings such that apertures 90 line up with mating fasteners 55 and 60 on the adjacent surfaces of the rings, the male portions of such fasteners being received through the apertures such that the bag 25 is firmly fastened to the mounting means 30. It will be appreciated that by this arrangement, rather than the harness or bag mounting rings, an inner surface of the bag surrounds the animal's rectum thereby minimizing the risk of soiling of the harness or mounting rings by the excrement of the animal. Furthermore, inasmuch as the bag need not be provided with fastening means other than the apertures therein, the bags may be changed frequently without economically burdening the user. The bag and mounting means are readily attachable to and detachable from the harness as a subassembly for ease in changing bags. Thus, it will be understood that when it is desired to replace a bag containing animal excrement with a fresh bag, the assembly of the bag and mounting means is detached as a unit from the harness allowing the bag to be replaced without interference from movement of the animal. The rings are then detached from one another, the used bag replaced, and the rings then fastened to one another, and the bag and rings subassembly attached as a unit to the harness.

Referring to FIG. 5, an alternate embodiment of the invention is shown wherein opening 62 in stomach underlying strap 50 communicates with a second disposable bag 95 provided for the reception and containment of the animal's urine. Bag 95, like bag 25 includes a body portion and reduced neck, the neck being easily tied for sealing the bag after use and isolating the urine from the animal. Bag 95 also includes a plurality of apertures 100 disposed around the mouth of the bag. Strap 50, on the surface thereof adjacent the animal, is provided with a plurality of fastener halves 55 disposed around opening 62. Also provided is a fastening ring 105 including therearound fastener halves 60 which mate with fastener halves 55. The bag is attached to the harness by inserting the neck of the bag into opening 62, folding the mouth of the bag over strap 50 so that apertures 100 register with the fasteners and attaching ring 105 over the mouth of the bag onto the mating fasteners on strap 50.

It will be appreciated that the apparatus of the present invention effectively traps animal excrements and is easily put on and removed from an animal. The means of bag attachment and detachment renders the apparatus convenient to service. Moreover, the construction of the harness and bag mounting rings from straight segments of elastic straps lends significant economy of construction and dimensional versatility to the apparatus.

Having thus described the invention, what is claimed is:

1. Animal excrement receptacle apparatus comprising:
a flexible harness adapted to fit over the posterior of an animal, said harness comprising a plurality of straps interconnected in generally coplanar unfolded configuration with a first of said straps being adapted to girth the tail of said animal and a second of said straps being adapted to extend longitudinally of said animal, and means for removably mounting an excrement receiving bag on said harness, said bag mounting means comprising a pair of concentric frames, a mouth portion of said bag being adapted to be removably received within the inner one of said frames, folded over said frame and fixed between said inner and outer frames, said outer frame, with said inner frame and bag, being removably secured to said harness between said first and second straps.

2. Animal excrement receptacle according to claim 1 wherein said mouth portion of said bag is of lesser cross sectional area than the remainder of said bag.

3. Animal excrement receptacle apparatus according to claim 1 wherein said plurality of harness straps are mutually disposed in generally open, rectangular configuration and include a third strap parallel to said first strap and adapted to girth the body of said animal and a fourth strap parallel to said second strap, said second and fourth straps being adapted to respectively underlie the stomach of and overlie the back of said animal.

4. Animal excrement receptacle apparatus according to claim 3 wherein said strap underlying said stomach includes therein an opening, said opening adapted to register with a disposable bag adapted to accommodate the animal's urine, said bag extending through said opening and removably attached to said stomach underlying strap at a portion of the upper surface thereof adjacent said opening.

5. Animal excrement receptacle apparatus according to claim 3 wherein each of said body and tail girth straps is adjustable in circumference.

6. Animal excrement receptacle apparatus according to claim 5 wherein said body and tail girthing straps are provided with pairs of spaced fasteners for said adjustability in circumference.

7. Animal excrement receptacle apparatus comprising a harness adapted to fit over the posterior of an animal, said harness including spaced rear terminal portions connected to means for mounting a disposable bag on said harness, said bag mounting means including first and second concentric frames comprising flexible straps, the ends of each strap being interconnectable to form a ring, each of said rings having interengaging fasteners on the opposed adjacent surfaces thereof, said fasteners connecting said rings together with a portion of a mouth of said bag being fixedly retained therebetween, said bag mouth extending interiorly of said first frame and being folded over the outside of said first frame thereby providing a disposable cover for said first frame for prevention of the soiling thereof by animal excrement, and said second frame being releasably attachable to said terminal harness portions by fasteners such that the assembly of said bag and said frame members is readily detachable from said harness.

8. Animal excrement receptacle according to claim 7 wherein the mouth of said bag is of lesser cross sectional area than the remainder thereof.

* * * * *